United States Patent

Leshets et al.

[11] Patent Number: 6,031,466
[45] Date of Patent: Feb. 29, 2000

[54] METHOD FOR REDUCING POWER CONSUMPTION IN WAIT-MODE

[75] Inventors: Yona Leshets, Zur Igaal; Dov Kimberg, Givataim, both of Israel

[73] Assignee: D.S.P.C. Technologies Ltd., Givat Shmuel, Israel

[21] Appl. No.: 09/046,183

[22] Filed: Mar. 23, 1998

[51] Int. Cl.[7] .................................................. G08B 5/22
[52] U.S. Cl. .................. 340/825.44; 370/313; 370/316; 714/704
[58] Field of Search ............... 340/825.44, 825.36, 340/825.49, 539, 572.1, 825.54, 825.06; 455/11.1, 67.1, 13.1, 63, 226.3, 412, 436, 430, 437, 445, 503, 575, 427, 422, 12.1, 31.2; 370/313, 316, 331, 320; 379/56.1; 714/704, 799, 818, 819

[56] References Cited

U.S. PATENT DOCUMENTS

| | | | |
|---|---|---|---|
| 4,839,639 | 6/1989 | Sato et al. | 340/825.44 |
| 4,961,073 | 10/1990 | Drapac et al. | 340/825.44 |
| 5,095,308 | 3/1992 | Hewitt | 340/825.44 |
| 5,233,344 | 8/1993 | Ohga | 340/825.44 |
| 5,459,456 | 10/1995 | Hosack et al. | 340/825.44 |
| 5,537,100 | 7/1996 | Hallberg | 340/825.44 |
| 5,581,594 | 12/1996 | McAfee | 379/56.1 |

*Primary Examiner*—Michael Horabik
*Assistant Examiner*—Jean B Jeanglaude
*Attorney, Agent, or Firm*—Darby & Darby

[57] ABSTRACT

A method for reducing power of a receiver, having an identification number and receiving a non sequential hailing message containing at least one hailed identification number, wherein the message includes a plurality of lines, each having a code portion and a code correction portion providing error correction of a predetermined number of errors per line, the method includes the steps of:

detecting portions of the hailed identification numbers within the received portion of the hailing message, comparing between the portions of the hailed identification numbers and the respective portion of the identification number, thereby detecting mismatches therebetween, and terminating reception of the hailing message if the number of the detected mismatches, for each of the portions of one hailed identification numbers, exceeds the maximal number of errors.

4 Claims, 8 Drawing Sheets

METHOD FOR REDUCING POWER CONSUMPTION IN WAIT-MODE

FIELD OF THE INVENTION

The present invention relates to power management in mobile communication devices in general and to reducing power consumption in wait-mode, when using non-sequential data format in a communication protocol.

BACKGROUND OF THE INVENTION

Methods for reducing power consumption in wait mode are known in the art. U.S. Pat. No. 4,961,073, to Drapac et al., teaches a method which operates in a communication protocol, having a paging transmission which includes two parts. While receiving the first part of the paging transmission, its validation is detected. If the first part is determined valid, then, the second part of the paging transmission is received. Otherwise, the power is disconnected from the receiver.

U.S. Pat. No. 5,537,100, to Hallberg, describes a method and device for use in pagers, which decodes a conventional serial paging transmission, using a methodology of looking for a pattern of non-correlated bits. The method according to this patent compares a received word with the address of the receiver of the pager and counts non-correlated bits between them.

For example, in a communication protocol having a Bose-Chaudhuri-Hocquenghen (BCH) decoder which is able to correct up to two errors, if at least three non-correlated bits are detected, then the received word is determined not relevant and the device disables power to the receiver, thereby reducing power consumption.

Figure 1:
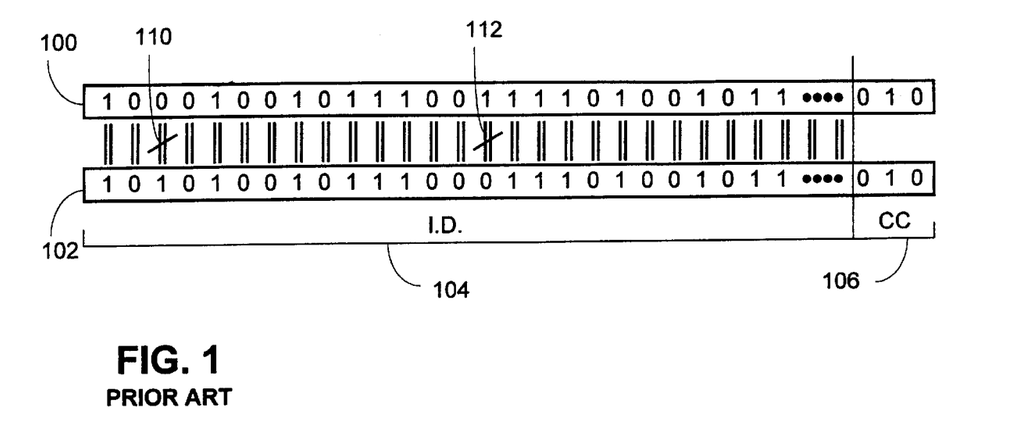
FIG. 1 is a schematic illustration of code collation, known in the art.

Reference is now made to FIG. 1 which is a schematic illustration of code collation, known in the art. Bit sequence 100 is the mobile station identifier (MSI) number of a receiver and bit sequence 102 is a received string of bits which is attached to a paging transmission. Sequence 102 includes an ID section 104 and a channel coding section 106, used for error correction. A BCH decoder, can correct up to one error in section 104, using section 106.

In the present example, there are two mismatches 110 and 112, between the received ID sequence and the MSI of the receiver. According to the prior art, if the number of mismatches is greater than the number of errors which can be corrected then, the received ID can be ignored. The reason being that even if the maximal number of errors in the received ID will be corrected using channel coding bits 106, there would still be at least one mismatch between the received ID and the MSI.

It will be appreciated by those skilled in the art that the above methods provide solutions for sequential data. Non sequential data can not be processed according to these methods. It will also be appreciated that in the art, there are no solutions to a situation when either the data or the channel coding bits are provided in a non-sequential format.

SUMMARY OF THE PRESENT INVENTION

It is an object of the present invention to provide a novel method or reducing power consumption in wait-mode, when using non-sequential ata format in communication protocol.

It is a further object of the present invention to provide a novel device for reducing power consumption in wait-mode, when using a non-sequential data format in communication protocol.

In accordance with one aspect of the present invention, there is thus provided a method for reducing power consumption of a receiver, having an identification number and receiving a portion of a hailing message in a non-sequential manner.

The hailing message includes a plurality of data lines and each data line includes an information portion and a channel coding portion.

The channel coding portion provides correction of a predetermined maximal number of errors of the information and the received portion of the hailing message includes the information portions of a plurality of the data lines. Accordingly, received portion of the hailing message contains at least a portion of the hailed identification numbers. The method includes the steps of:

detecting portions of the hailed identification numbers within the received portion, comparing between the portions of the hailed identification numbers and the respective portion of the identification number, thereby detecting mismatches therebetween, and terminating reception of the hailing message if the number of the detected mismatches, for each of the portions of one hailed identification numbers, exceeds the maximal number of errors.

In accordance with another aspect of the present invention, the method further includes the steps of:

receiving an additional portion of the hailing message, combining the additional portion with the received portion, and repeating from the step of detecting.

In accordance with a further aspect of the present invention, there is provided a device for reducing power consumption of a receiver, connected thereto. The receiver has an identification number and receives a portion of a hailing message in a non-sequential manner.

The hailing message includes a plurality of data lines, wherein each data line includes an information portion and a channel coding portion. The channel coding portion provides correction of a predetermined maximal number of errors of the information. The received portion of the hailing message includes the information portions of a plurality of the data lines thereby containing at least a portion of at least one hailed identification number.

The device includes a controller, connected to the receiver, a buffer, connected to the receiver, for temporarily storing the received portion of a hailing message, a storage unit, containing the identification number and a comparator, connected to the buffer, the storage unit and the controller, for comparing the portion of the at least one hailed identification number with the respective portion of the identification number.

The comparator provides the number of mismatches, between each portion of each hailed identification number and the respective portion of the identification number, to the controller.

The controller provides a power reduce command to the receiver, when all of the numbers of mismatches, exceed the predetermined maximal number of errors.

The buffer can further accumulate additional portions of the received portion of a hailing message.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention overcomes the disadvantages of the prior art by processing the received non-sequential data and addressing each received bit in view of the respective bit in the ID of the receiving unit MSI. The present invention also provides a novel method which utilizes channel coding information, when channel coding (CC) information is provided in a non-sequential format.

Figure 2:
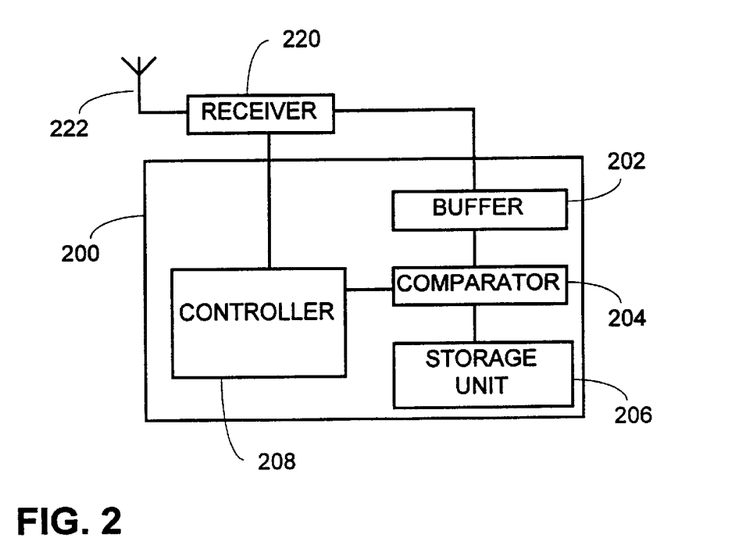
FIG. 2 is a schematic illustration of a device for reducing power consumption in wait-mode, constructed and operative in accordance with a preferred embodiment of the present invention.

Reference is now made to FIG. 2, which is a schematic illustration of a device, generally referenced 200, for reducing power consumption in wait-mode, constructed and operative in accordance with a preferred embodiment of the present invention. Device 200 includes a controller 208, a comparator 204 connected to the controller 208, a storage unit 206 and a buffer 202, both connected to the comparator 204. The controller 208 of device 200 is also connected to a receiver 220, which is further connected to an antenna 222 and to buffer 202.

The receiver 220 receives a transmitted signal via the antenna 222 and provides it to the buffer 202. The storage unit 206 includes the ID string of the receiver 220 (MSI). The comparator 204 scans the received bits and determines the location of the respective bit in the MSI, for each of the received bits.

Then the comparator 204 compares each of the received ID bits with the respective bit of the MSI. If the number of mismatches is greater than a predetermined number $N_{ERROR}$ of errors allowed, then the controller 208 provides a command to the receiver 220 to cease from receiving the remainder of the transmission thereby reducing power consumption.

According to the present invention, $N_{ERROR}$ is determined according to channel coding bits, when channel coding (CC) bits are provided in a non sequential format.

Figure 3:
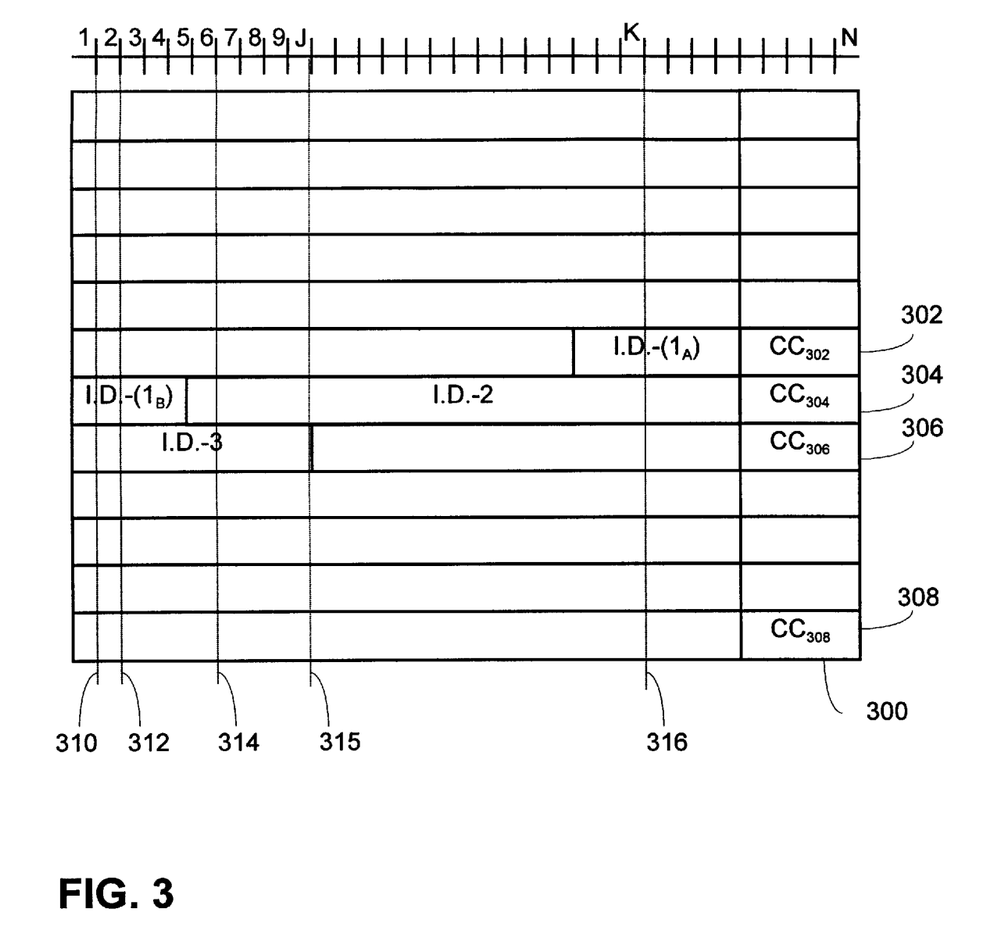
FIG. 3 is a schematic illustration of a received transmission message, with explicatory marks, in accordance with a preferred embodiment of the present invention.

Reference is now made to FIG. 3, which is a schematic illustration of a received transmission message, generally referenced 300, with explicatory marks, in accordance with a preferred embodiment of the present invention.

Message 300 includes a plurality of lines, such as lines 302, 304, 306 and 308. Each line ends with a channel coding (CC) string of bits. In the present example, lines 302, 304, 306 and 308 end with CC strings $CC_{302}$, $CC_{304}$, $CC_{306}$ and $CC_{308}$, respectively. These CC strings enable correction of up to one error in a line, thus $N_{ERROR}=1$.

Line 308 includes a cyclic redundancy code (CRC) which is further used to determine if the complete message is intact.

The receiver 220 (FIG. 2) receives message 300 in an interleaved format (i.e., column by column) wherein the bits of column 1 are received first, at time point 310, then the bits of column 2 are received at time point 312, followed by the bits of column 6, which are received at time point 314, whereas the bits of column K are received at time point 316.

Lines 302, 304 and 306 include portions or complete ID strings, representing the identity of the receiver, to which message 300 is destined for. Line 302 includes a first portion of a first ID string—ID($1_A$). Line 304 includes the second portion of the first ID string—ID($1_B$), as well as a complete second ID—ID(2). Line 306 includes an ID string ID(3).

It will be noted that some communication standards, such as RCR-27 (PDC), support multiple length ID numbers. ID(1) and ID(3) are single length ID numbers while ID(2) is a double-length ID number.

At time point 315, ID($1_B$), ID(3) and a portion of ID(2), are received. At that time, if a comparison between the relevant bits of the ID of the receiver 220 yields more than $N_{ERROR}$ for each of these lines, then the controller 208 provides a command to the receiver 220, so as to cease from receiving the rest of message 300, thereby reducing power consumption.

According to a first example, the MSI is a single-length ID number. Up until the Jth bit (315), the device 200 detects a single mismatch between ID($1_B$) and the respective portion of the MSI and another three mismatches between ID(3) and the MSI.

It will be appreciated by those skilled in the art that some communication standards do not provide an indication of the length of an ID. In this case, the device 200 refers to the received information with respect to its own ID length, only. For example, the device 200 selects a string of bits from the received message, which begins at any location in the message which may include an ID. The length of this string is identical to the length of the MSI.

Since ID(3) includes more than one mismatch, then even if one of these mismatches is an error, which can be corrected using $CC_{306}$, there would still be at least another mismatch between ID(3) and the MSI.

With ID($1_B$), having a single mismatch, it is possible that this mismatch is an error, which can be corrected using $CC_{304}$, provided that ID($1_A$) is identical to the first portion of the MSI, or at least is in the same position as ID($1_B$) (i.e., has no more than $N_{ERROR}$ mismatches).

If, on the other hand, after receiving the Kth (316) bit of line 302, ID($1_A$) had more than one mismatch, then no further reception of this message would have been required, since even if one of these mismatches is an error, which can be corrected using $CC_{302}$, then there would still be at least another mismatch between ID($1_A$) and the MSI.

According to one aspect of the present invention, the receiver is capable of detecting the length of a received ID. Accordingly, after receiving the Kth bit (316), the receiver detects that the length of ID(2) is greater than the length of a single length ID and hence, discards it.

According to another aspect of the present invention, the receiver is incapable of detecting the length of a received ID. Accordingly, the receiver processes a double length ID string such as of ID(2), as if it were two single length ID strings.

According to a second example, the MSI is a double-length ID number. Up until the Jth bit (315), the device 200 detects that ID(1) and ID(3) are single length ID numbers and that there are two mismatches between ID(2) and the MSI. At that point, the controller 208 provides a command to the receiver 220, to cease from receiving message 300, since even if one of these mismatches is an error, which can be corrected using $CC_{304}$, then there would still be at least another mismatch between ID(2) and the MSI.

Figure 4:
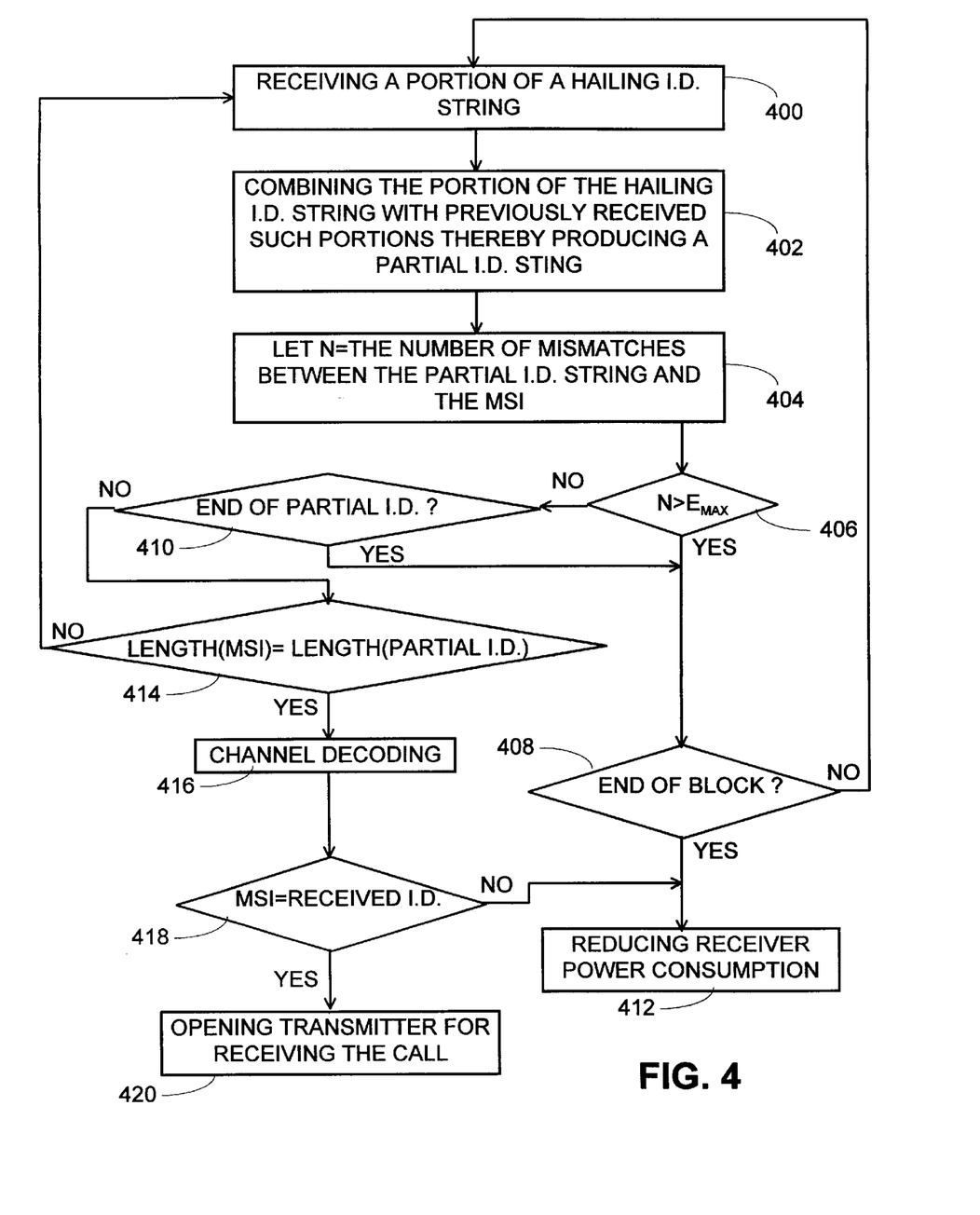
FIG. 4 is a schematic illustration of a method for operating the device of FIG. 2, operative in accordance with another preferred embodiment of the present invention.

Reference is now made to FIG. 4, which is a schematic illustration of a method for operating device 200, operative in accordance with another preferred embodiment of the present invention.

In step 400, the receiver receives a portion of a paging ID string. In the present example, the device 200 receives a column of bits of message 300 and detects which of the received bits is assigned to an ID number. In the second column, the bits which are assigned to ID numbers are the bits in lines 304 and 306.

In step 402, the device 200 combines these ID bits to the ID bits which were received previously. In the present example, the bit in the second column, line 304 is attached to the bit in the first column, line 304, so as to form the partial ID string of $ID(1_B)$. Similarly, the bit in the second column, line 306 is attached to the bit in the first column, line 306, so as to form the partial ID string of ID(3).

In step 404, the device 200 compares the first bit of the partial ID string $ID(1_B)$ with the eighth bit of the MSI and the second bit of the partial ID string $ID(1_B)$ with the ninth bit of the MSI ($ID(1_A)$ includes seven bits). Furthermore, the device 200 compares the first bit of the partial ID string ID(3) with the first bit of the MSI and the second bit of the partial ID string ID(3) with the second bit of the MSI. The number of detected mismatches is stored in a variable N, for each comparison procedure.

In step 406, the device 200 detects if N exceeds a predetermined number of mismatches $E_{MAX}$. $E_{MAX}$ is the maximal number of errors which can be corrected, using the channel coding provided with the received message. If so, then the device proceeds to step 408. Otherwise, the device proceeds to step 410.

In step 408, the device 200 detects if all of the I.D. sections in the received message 300 were scanned. If so, then the device 200 provides a command to the receiver 220, so as to cease from receiving the rest of message 300, thereby reducing power consumption, for a predetermined period of time (step 412). Otherwise, the device 200 repeats from step 400.

In step 410, the device 200 detects if the current received bit is the last bit of a partial I.D. (for example, the bit in the fifth column, line 304 which is the last bit of I.D.—$(1_B)$). If so, then the device proceeds to step 408. Otherwise, the device 200 proceeds to step 414.

In step 414, the device 200 detects if the received ID has been received in full. This can be done in many ways known in the art, one of them being detecting if the length of the MSI is identical to the length of the received ID. If so, then the device proceeds to step 416 where any errors are corrected using the channel coding information attached to message 300. Otherwise, the device proceeds back to step 400, to receive the next column of message 300.

In step 418, the device 200 detects if, after all errors were corrected, the received ID is identical to the MSI. If so, then the device 200 maintains the receiver 220 open and may open a transmitter for notifying the paging transceiver that it receives the call. Otherwise, the device 200 proceeds to step 412.

The following is an explanation of an implementation of the method of the present invention for RCR-27 communication standard.

Figure 5:
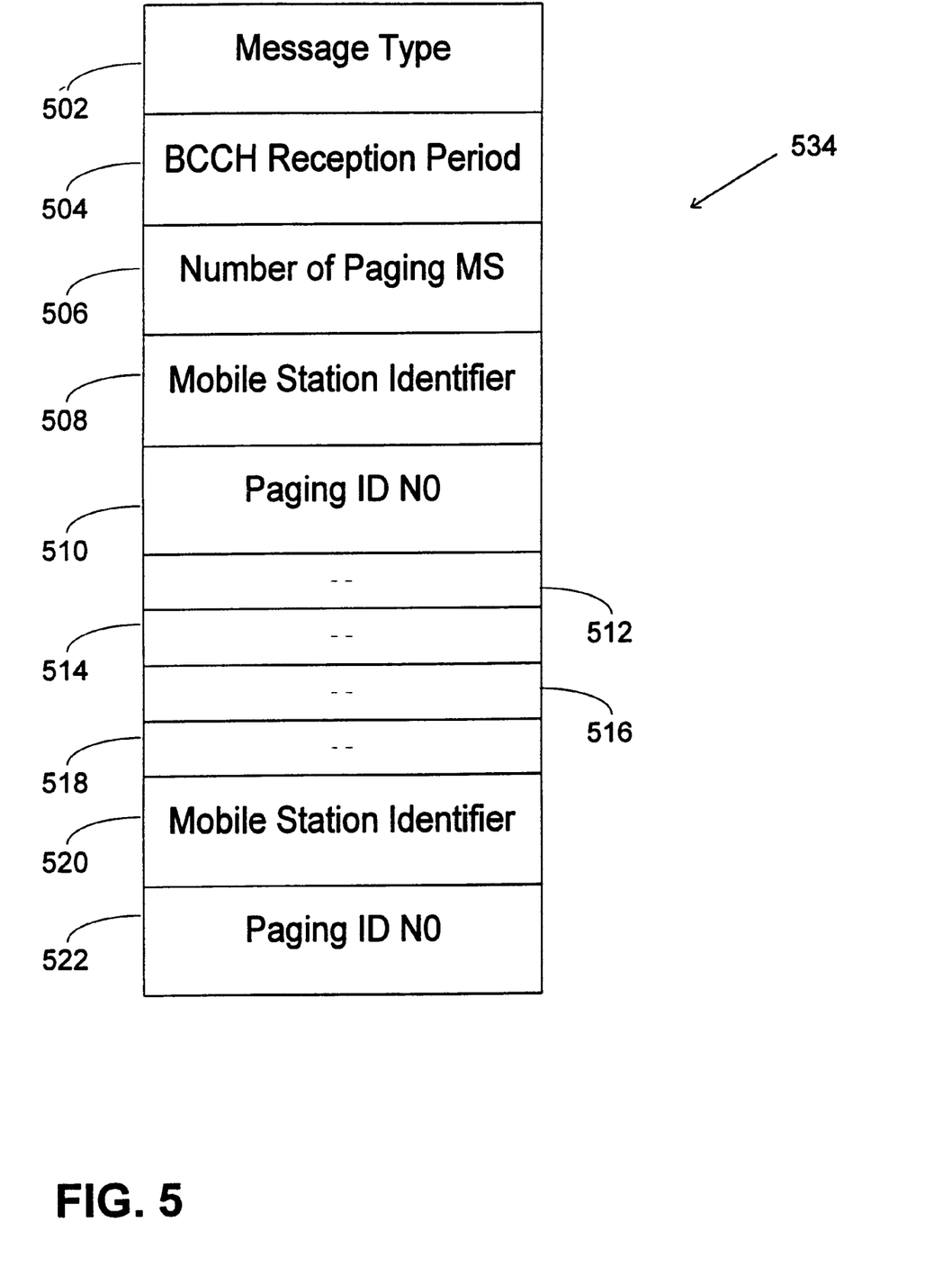
FIG. 5 is a schematic illustration of a third protocol layer, of a typical RCR-27 (PDC) paging message.
Figure 6:
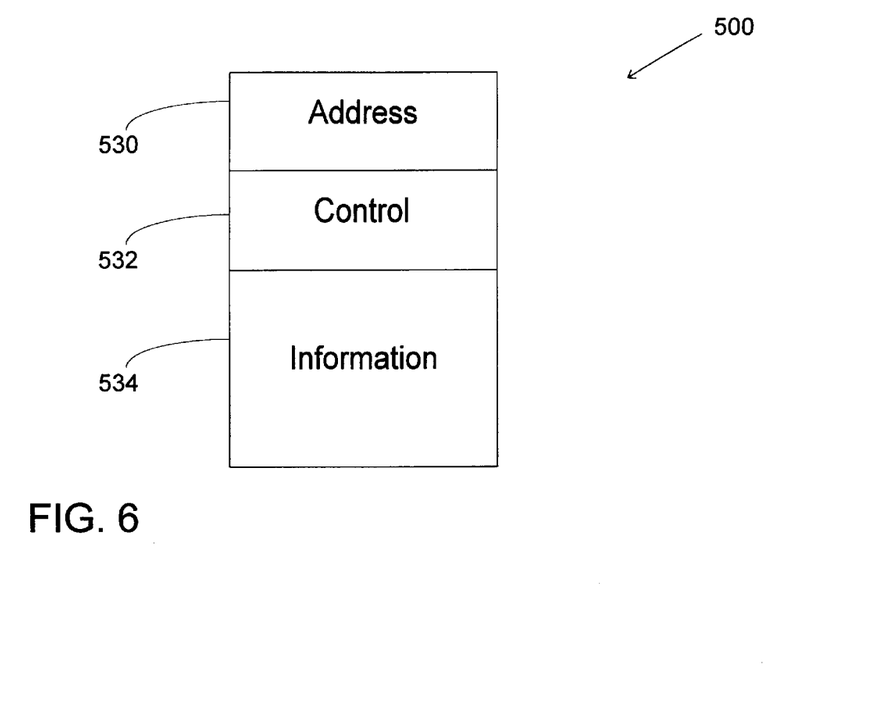
FIG. 6 is a schematic illustration of a second protocol layer, of the paging message of FIG. 5.
Figure 7:
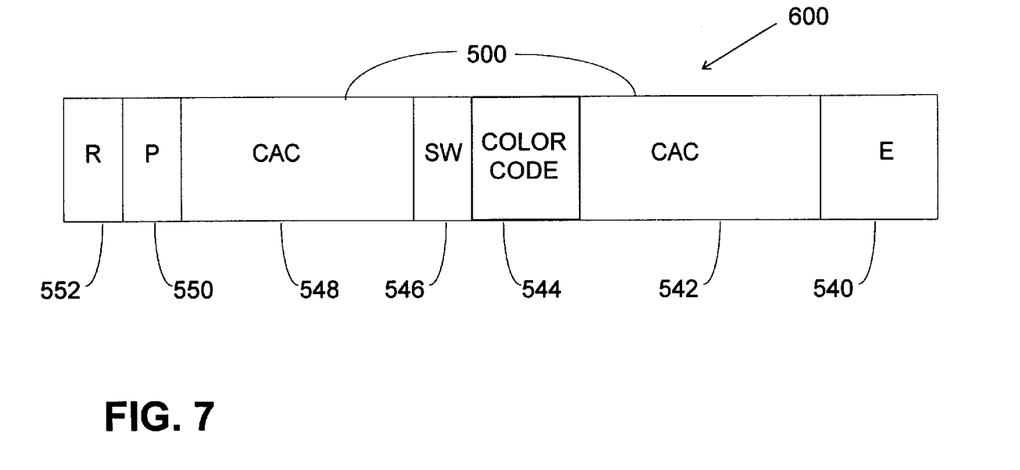
FIG. 7 is a schematic illustration of a first protocol layer, of the paging message of FIGS. 5 and 6.
Figure 8:
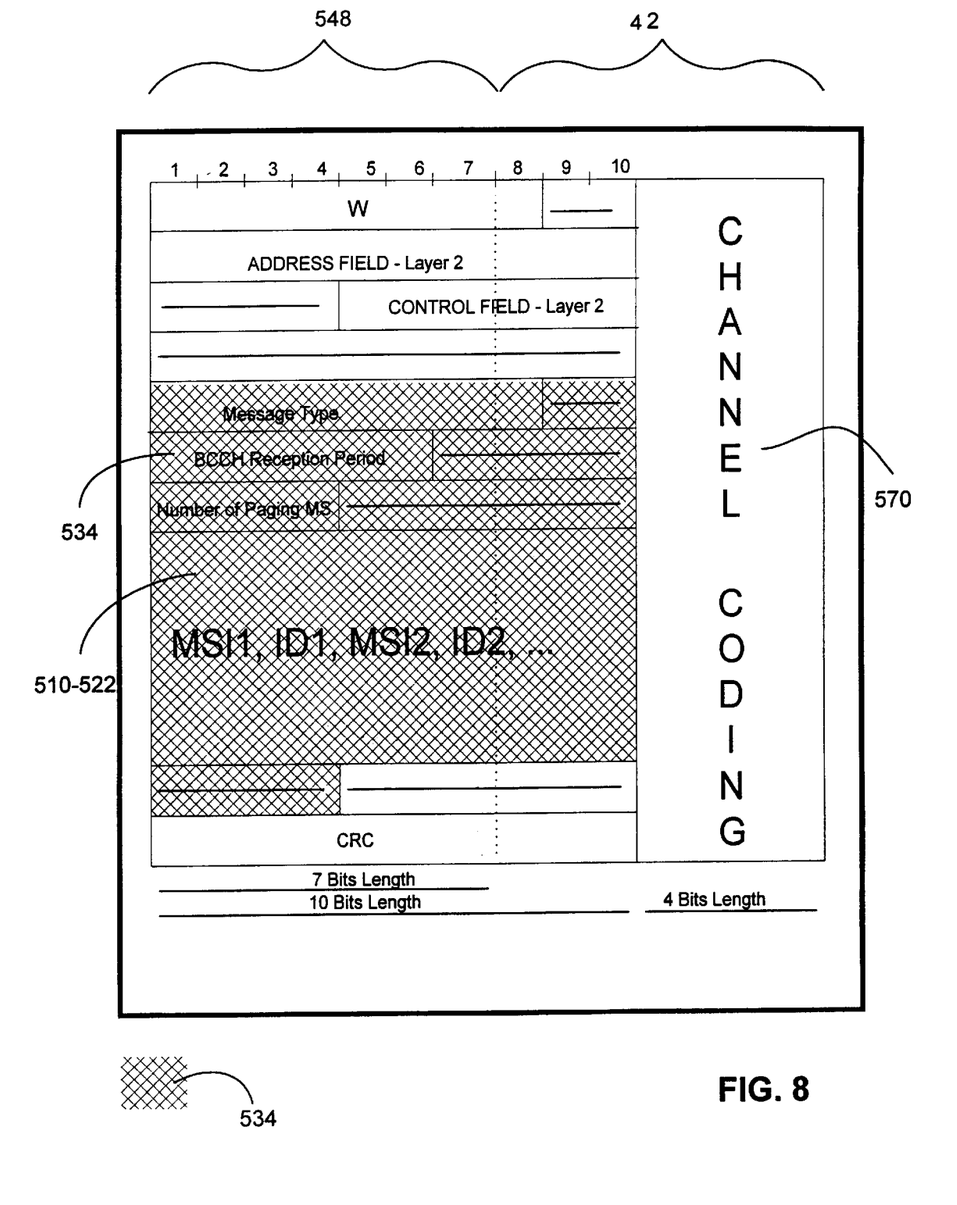
FIG. 8 is a schematic illustration of the paging message format at the first protocol layer, of a portion of the paging message of FIG. 7.

Reference is now made to FIGS. 5, 6, 7 and 8. FIG. 5 is a schematic illustration of a third protocol layer of a typical RCR paging message. FIG. 6 is a schematic illustration of a second protocol layer of the paging message of FIG. 5. FIG. 7 is a schematic illustration of a first protocol layer of the paging message of FIGS. 5 and 6. FIG. 8 is a schematic illustration of the paging message format at the first protocol layer, of a portion of the paging message of FIG. 7.

With reference to FIG. 5, a third layer 534 of a paging message according to RCR communication standard includes a plurality of fields as follows:

a message Type field 502 (one byte), a BCCH reception Period field 504 (one byte), for indicating the number of super-frames from 0 to 15, prior to receiving BCCH, a Number of Paging MS field 506 for indicating the number of mobile station I.D. numbers which are included in the paging message, Mobile Station Identity fields 508, 512, 516 and 520 which include the I.D. numbers of the hailed at stations (up to sixty-four bits each), and Paging ID Number fields 510, 514, 518 and 522 which includes the identification number of the hailing station (one byte each).

With reference to FIG. 6, the second layer of the paging message includes three fields, wherein each field has the length of N (integer) octets (eight bits), as follows:

An address field 530, which includes two octets for PCH, a control field 532 which includes two octets, and the Information field 534, which contains the PAGING message as describe in FIG. 5 and has the length of N octets.

With reference to FIG. 7, the first protocol layer 600 includes two hundred and eighty bits of information which are divided into plurality of fields which are ramp (R) bits field 552, preamble (P) field 550, common access channel (CAC) I field 548, sync word (SW) field 546, color code field 544, common access channel (CAC) II field 542 and collision control bits (E) field 540. The common access channel (CAC) message 500, includes two hundred and twenty four bits and is divided into two parts 548 and 542 containing one hundred and twelve bits, each.

With reference to FIG. 8, there is shown an elaborated diagram of the CAC portions 642 and 648, which are generally similar to CAC portions 542 and 548 of message 500. The dotted line indicates the end of the first part of CAC message 548, which is received before a sync-word (SW) field and a color code field and includes seven bits in each line. In this example, the address field is of a length of two bytes.

Referring back to FIG. 8, the method of the present invention can be used for receiving paging channel (PCH) during intermittent reception. The number of received bits in the first part of the CAC 548 message are one hundred and twelve. These bits are parts of several fields within the CAC message 600.

The MSI fields may include up to eighty bits in the original paging message but only fifty six bits of them are received in the first part of the CAC message 548. A BCH coding mechanism represented by channel coding fields 570 is used to correct errors which may occur in the reception process of message 534. In the present example, the channel coding code 570 can correct up to one error in a single line. If the number of errors in a single line is more than one, then the whole message is discarded. At the MS there are three possibilities when receiving PCH:

a. The message is received incorrectly (CRC error) wherein there is at least one line with more than a single error. In this case the message is ignored.

b. The message is received properly (each line having no more than a single error) but the MSI doesn't match with the MSI of the receiving station. In this case, the message is received, but has no influence on the MS. In the art, this case has the same impact on the receiving station as the first case. It is assumed that in waiting state, this possibility is most likely and thus dominates the current consumption of the handset. The present invention excludes this case, using a novel algorithm which monitors only the first part of the CAC message 548.

c. The message is received properly and the MSI is the same compared to own MSI.

The method of the invention (step 404 of FIG. 4) counts the number of mismatches for each potential location of the MSI within the CAC message 534, as well as the number of errors in the lines which include MSI information 510–522. If there is at least one line, for each comparison, which has more than one error, then the algorithm of the method determines this message as "continuation is unnecessary" and it disables the reception of the second part of the CAC message. In any other case, the reception continues.

The SW and the color code are always received. There may be cases in which the number of received bits from each line will not be sufficient to eliminate unmatched MSIs (the difference appears in the bits which weren't received). In this case the receiving station will continue receiving the incoming message after receiving the SW 546. However, each received MSI is bound by N (integer) number of octets.

The method according to this aspect of the invention includes the steps of:

1st. Determining the beginning of the MSI within the received CAC message.

2nd. Comparing between the MSI of the receiving station and the received MSI (as was determine in the first step). The comparison is against the received bits only.

3rd. Counting the number of errors in each line.

4th. Terminating reception of the current message if there is at least one line with more than a predetermined maximal number of errors, for each potential point.

5th. Repeating steps A–D for all the potential points.

Reference is now made to FIGS. 9A–9H which are illustrations of a comparison procedure, according to another preferred embodiment of the invention.

In the present example, the MSI length of the receiving station is twenty four bits. This MSI number is: 000100100011010001010110.

The Received MSI is:

100xxx1101110xxx0101110xxx1001001xxx0101
111xxx0010000xxx1001110xxx0101011xxx0101

With reference to FIGS. 9A–9H, the received MSI is illustrated in non-bold characters, while the MSI of the receiving station is illustrated in bold characters, located underneath the received information. Each line in the received message is illustrated in a format NNNNNNNXXX, wherein N represents a received MSI information bit and X represents a non received MSI bit. Each mismatch between the MSI of the receiving station and the received information is marked with a square. The maximal number of errors, allowed for a selected line is one error.

Figure 9A:
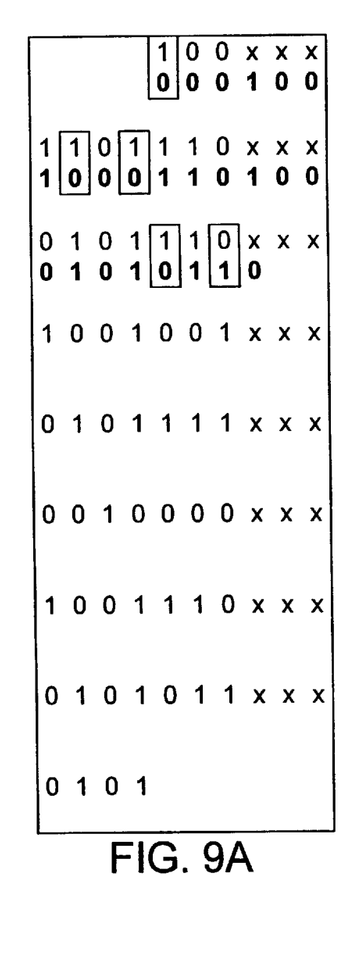
FIGS. 9A–9H are illustrations of a comparison procedure, according to another preferred embodiment of the invention.

In FIG. 9A, the starting point is determined at the beginning of the first octet (first group of eight bits). There is one mismatch in the first line, two mismatches in the second line and two mismatches in the third line.

Figure 9B:
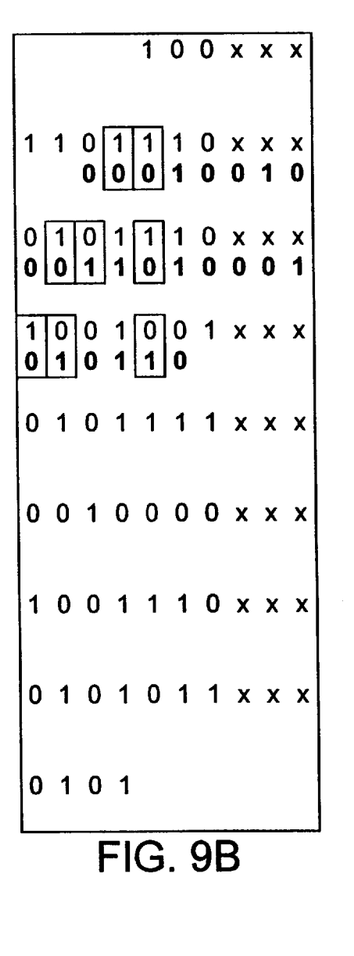

In FIG. 9B, the starting point is determined at the beginning of the second octet (second group of eight bits). There are two mismatches in the second line, three mismatches in the third line and three mismatches in the fourth line.

Figure 9C:
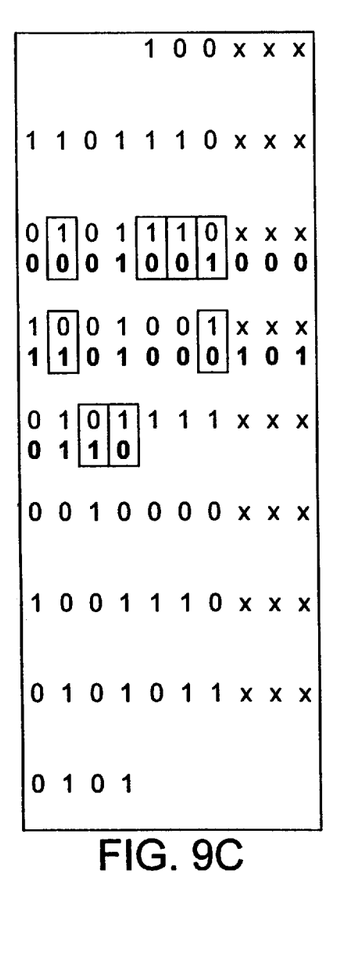

In FIG. 9C, the starting point is determined at the beginning of the third octet (third group of eight bits). There are four mismatches in the third line, two mismatches in the fourth line and two mismatches in the fifth line.

Figure 9D:
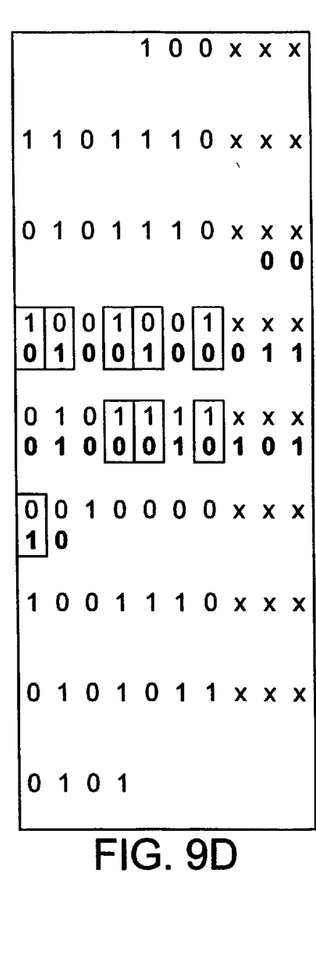

In FIG. 9D, the starting point is determined at the beginning of the fourth octet (fourth group of eight bits). There are five mismatches in the fourth line, three mismatches in the fifth line and one mismatch in the sixth line.

Figure 9E:
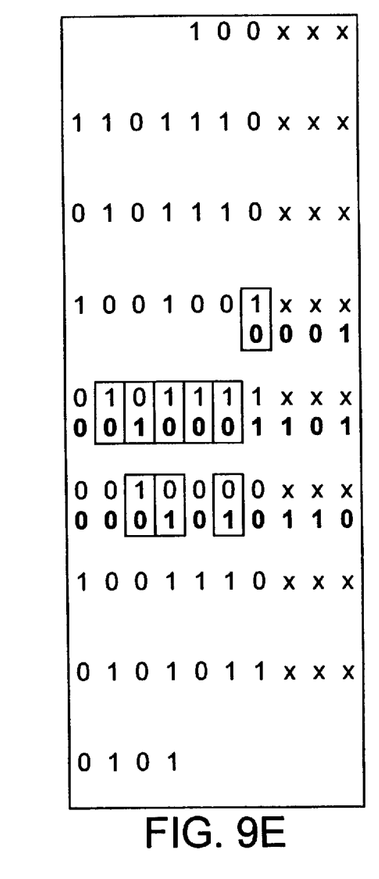

In FIG. 9E, the starting point is determined at the beginning of the fifth octet (fifth group of eight bits). There is a single mismatch in the fourth line, five mismatches in the fifth line and three mismatches in the sixth line.

Figure 9F:
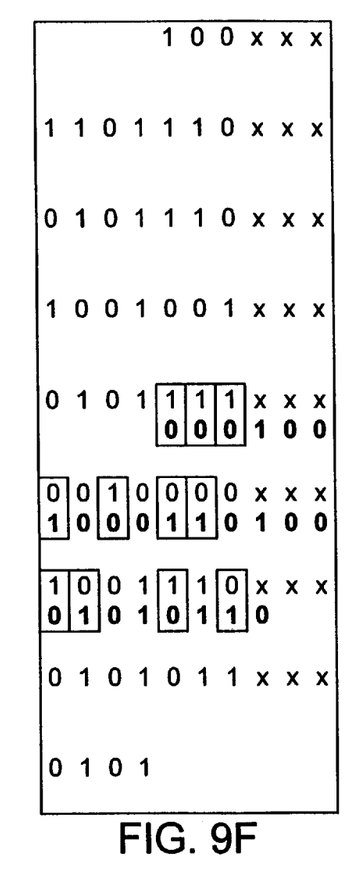

In FIG. 9F, the starting point is determined at the beginning of the sixth octet (sixth group of eight bits). There are three mismatches in the fifth line, four mismatches in the sixth line and four mismatches in the seventh line.

Figure 9G:
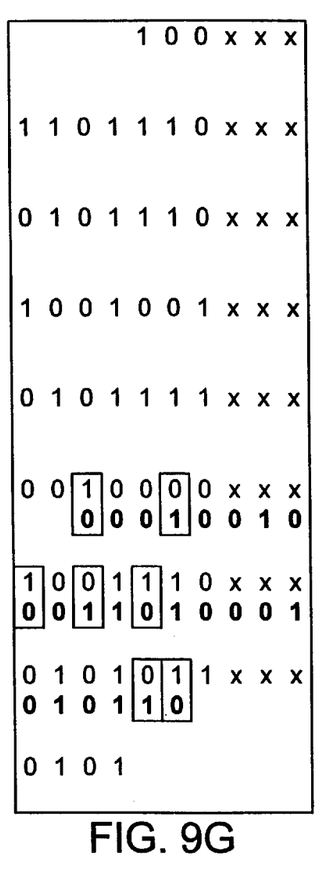

In FIG. 9G, the starting point is determined at the beginning of the seventh octet (seventh group of eight bits). There are two mismatches in the sixth line, three mismatches in the seventh line and two mismatches in the eighth line.

Figure 9H:
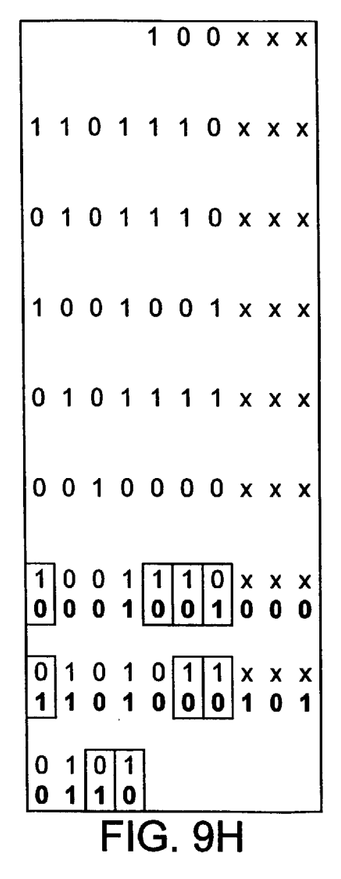

In FIG. 9H, the starting point is determined at the beginning of the eighth octet (eighth group of eight bits). There are four mismatches in the seventh line, three mismatches in the eighth line and two mismatches in the ninth line.

Each of the above comparisons yielded at least two mismatches in at least one compared line. Thus, the MSI of the receiving station can not be detected in the received MSI information. Hence, the method of the present invention terminates the reception of the rest of the hailing message.

The following is a calculation of the probabilities of detecting an MSI, having a length of twenty four bits, in received MSI information, of the first CAC portion 548.

In this case, the maximal number of mismatches, allowed for a selected line in the received MSI information is determined by the CC portion to be a single error.

In the present example, the calculations are provided for a case presented in FIG. 9E. Assuming random bits, the probability for this event is detecting, in each line, 6 out of 7 OR detecting 7 out of 7 which is given by:

$$[7/(2^7)+1/(2^7)]^2 \sim 0.004$$

The following is a calculation of the probability for eliminating other MSI's in the entire message. In the present example, we assume that the probabilities for detecting the correct MSI in all of the cases set forth in FIGS. 9A–9D and 9F–9H, are similar to the one of the case shown in FIG. 9E. The probability for this event is ONE minus the previous probability for all the possibilities, which is given by:

$$(1-0.004)^8 = 0.968$$

It will be appreciated that the term identification number includes any format of any identification string which can include any type of symbol such as a number, at any base, a character, and the like.

It will be appreciated by persons skilled in the art that the present invention is not limited to what has been particularly shown and described hereinabove. Rather the scope of the present invention is defined by the claims which follow.

We claim:

1. Method for reducing power consumption of a receiver, having an identification number and receiving a portion of a hailing message in a non-sequential manner, the hailing message including a plurality of data lines, each data line including an information portion and a channel coding portion, the channel coding portion providing correction of a predetermined maximal number of errors of the information, the received portion of the hailing message including the information portions of a plurality of the data lines thereby containing at least a portion of at least one hailed identification number, the method including the steps of:

detecting portions of said at least one hailed identification number within said received portion;

comparing between said portions of said at least one hailed identification number and the respective portion of said identification number, thereby detecting mismatches therebetween; and     terminating reception of said hailing message if the number of said detected mismatches, for each of said portions of said at least one hailed identification number, exceeds said maximal number of errors.

2. The method according to claim 1, further comprising the steps of:

receiving an additional portion of said hailing message;

combining said additional portion with said received portion; and     repeating from said step of detecting.

3. A device for reducing power consumption of a receiver, connected thereto, the receiver having an identification number and receiving a portion of a hailing message in a non-sequential manner, the hailing message including a plurality of data lines, each data line including an information portion and a channel coding portion, the channel coding portion providing correction of a predetermined maximal number of errors of the information, the received portion of the hailing message including the information portions of a plurality of the data lines thereby containing at least a portion of at least one hailed identification number, the device comprising:

a controller, connected to said receiver;

a buffer, connected to said receiver, for temporarily storing said received portion of a hailing message;

a storage unit, containing said identification number; and     a comparator, connected to said buffer, said storage unit and said controller, for comparing said at least a portion of at least one hailed identification number with the respective portion of said identification number;

wherein said comparator provides the number of mismatches between each said at least a portion of at least one hailed identification number and said respective portion of said identification number to said controller, and     wherein said controller provides a power reduce command to said receiver, when each said number of mismatches, exceeds said predetermined maximal number of errors.

4. The device according to claim 3, wherein said buffer accumulates additional portions of said received portion of a hailing message.

* * * * *